United States Patent [19]

Trotta

[11] 4,052,856
[45] Oct. 11, 1977

[54] METHOD AND APPARATUS FOR HARNESSING THE POWER OF MOVING WATER

[76] Inventor: Robert Trotta, 2954 W. 8th St., Brooklyn, N.Y. 11224

[21] Appl. No.: 627,237

[22] Filed: Oct. 30, 1975

[51] Int. Cl.² .................... F03G 3/02; F03G 3/04
[52] U.S. Cl. ................................................ 60/639
[58] Field of Search ............ 60/495, 497, 504, 507, 60/639, 640, 398; 415/5; 185/4, 6, 27, 32

[56] References Cited

U.S. PATENT DOCUMENTS

| 304,072 | 8/1884 | Buell | 60/639 |
| 920,361 | 5/1909 | Merriam | 415/5 |
| 1,085,703 | 2/1914 | Rochelle | 60/639 |
| 2,104,984 | 1/1938 | Grondahl | 415/5 |
| 3,297,300 | 1/1967 | Mountanos | 60/504 |

FOREIGN PATENT DOCUMENTS

| 542,412 | 7/1923 | France | 60/639 |

Primary Examiner—Allen M. Ostrager
Attorney, Agent, or Firm—Arthur T. Fattibene

[57] ABSTRACT

A method and apparatus of harnessing the power of water in a moving body of water, e.g., a river or stream, wherein such waters are utilized to successively fill containers to effect a displacement thereof and which displacement is translated into rotational mechanical energy for producing useful work.

16 Claims, 13 Drawing Figures

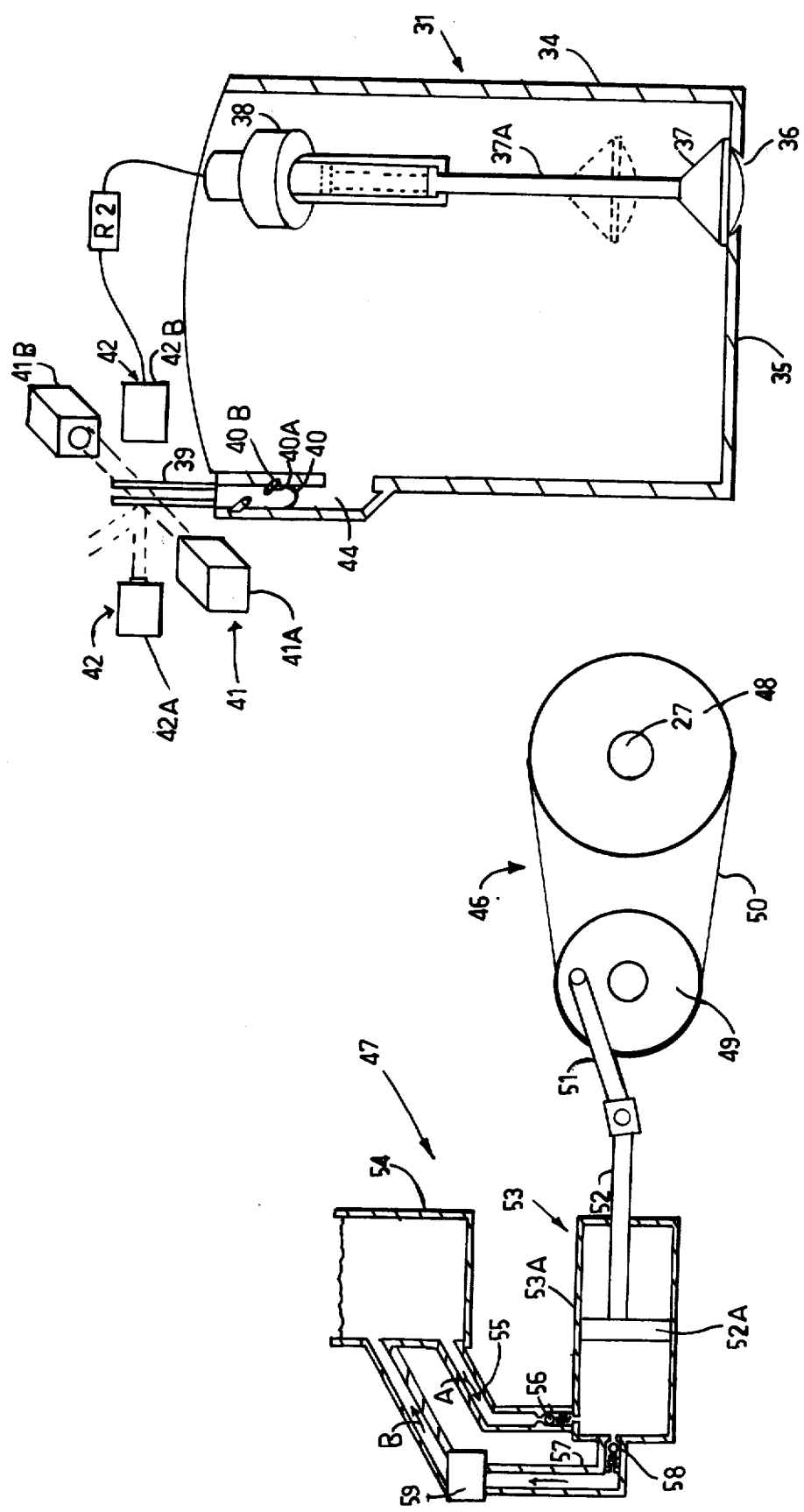

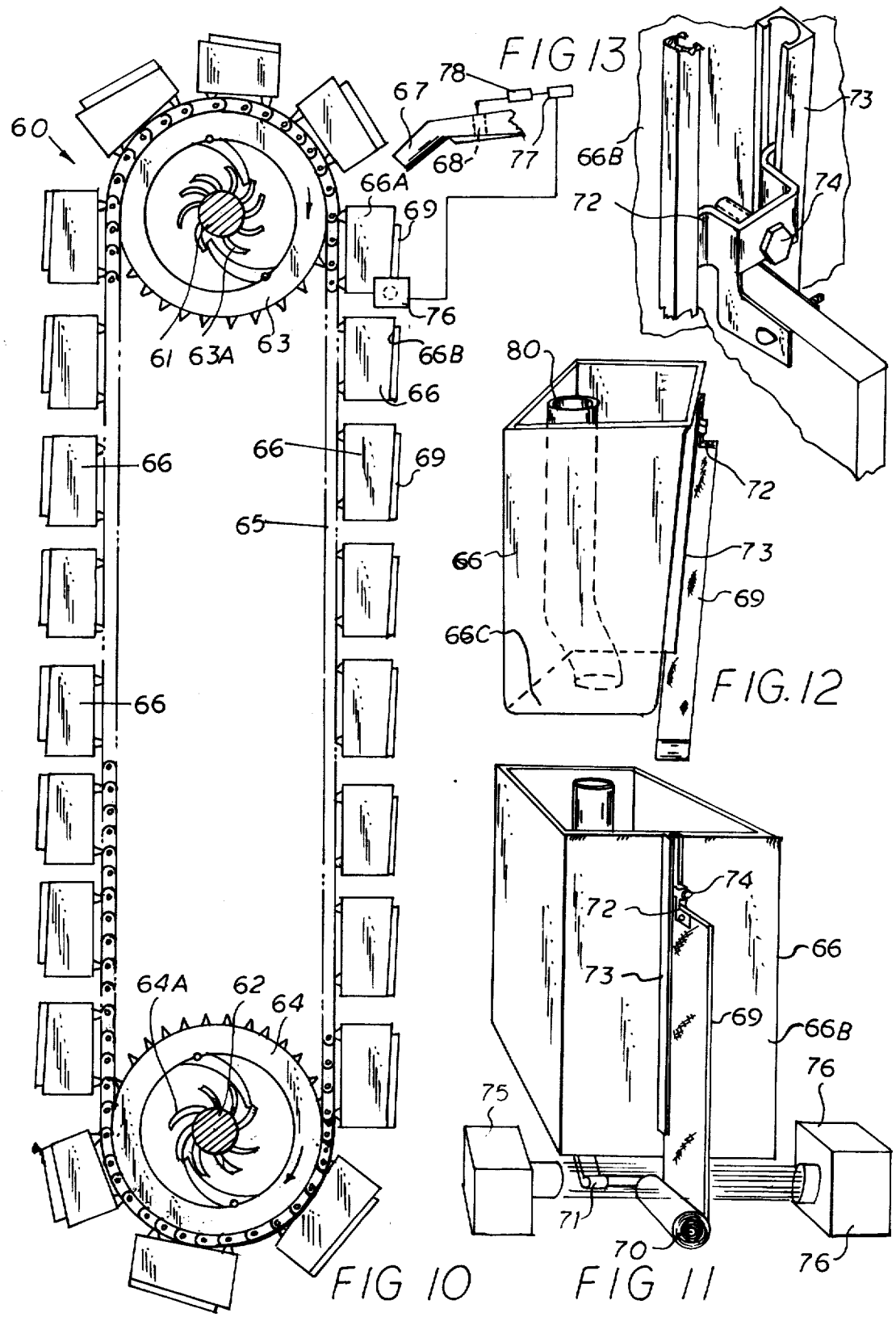

METHOD AND APPARATUS FOR HARNESSING THE POWER OF MOVING WATER

PROBLEM AND PRIOR ART

Numerous methods and devices have been conceived in an effort to harness the energy of moving water; e.g., a device for harnessing the vertical movement of ocean tides, or for utilizing the motion of waves or swells to produce rotation of a shaft. However, where a body of water does not possess a wave phenomonon or rising tides, e.g., a river or stream, the known water motors are rendered inoperative for use with such bodies of water.

OBJECTS

It is an object of this invention to provide a method and apparatus for utilizing the water power inherent in a river or stream to provide useful work.

Another object is to provide a method and apparatus for utilizing the potential energy in a body of water to produce useful work.

Another object is to provide a method and apparatus for extracting the energy inherent in a body of water without upsetting the environmental balance.

Another object is to provide a method and apparatus for translating the rise and fall of predetermined amounts of water into useful work.

Another object is to provide a method and apparatus wherein a plurality of power stations embodying the present invention can be operated simultaneously along the shore of a common body of water without adversely affecting one another.

BRIEF SUMMARY OF INVENTION

The foregoing objects and other features and advantages of this invention is attained by the method of utilizing power of flowing water, e.g., a river or stream by including a submerged conduit in the body of water and connecting a stand pipe to the discharge end of the conduit to raise the water therein to an elevation below that of the inlet to the inclined conduit, and thereafter distributing the water in a predetermined sequential manner to a series of containers counterbalanced on a drive shaft whereby the alternate rising and falling of the containers as they are filled and emptied of the water effects the rotation of the drive shaft to produce useful work.

A system or apparatus for harnessing the power of moving water in accordance with the described method comprises a pair of spaced apart shafts having one or more rotary elements such as a sprocket journalled thereon. Operatively associated with such sprocket is a unidirectional clutch arranged so that the sprocket effects the drive of the shaft in one direction only. Threaded about the sprockets is a flexible drive to which one or more containers are connected. The arrangement is such that the containers rise and fall as they are sequentially filled with water and emptied in a predetermined manner.

Operatively associated with the apparatus is a means for sequentially charging and discharging the containers with water to effect the rise and fall thereof. This is attained by disposing an inclined conduit in a body of water so that the outlet end is disposed at an elevation below that of the inlet end. A stand pipe is connected to the outlet end of the conduit to raise the water to an elevation below that of the inlet. Connected to the outlet end of the stand pipe is a distributing manifold pipe having one or more nozzles for discharging the water into one of the containers. A valve means controls the discharge of the water from the respective nozzles when the container is at its suppermost elevation.

In one form of the invention, counterbalancing containers are connected to the flexible drive, and a coordinating means is provided to control the charging and discharging of the containers in a timed sequence so that the alternate rising and falling of the containers will effect the drive of the drive shaft, the rotation of which is translated into useful work.

Operatively associated with the system is a control for regulating the speed at which the system can function. The speed controller in this embodiment comprises a positive displacement piston pump actuated by the rotation of the drive shaft and which pump is in circuit with a source of circulating fluid. A regulating valve is interposed in the circuit to control the speed of the pump and in turn the speed of the drive shaft.

In another form of the invention the containers are connected at spaced intervals along an endless flexible drive. In this form, a container has a flexible ribbon which is adjustably positioned and which is operatively associated with actuating means for controlling the opening and closing of the valve to regulate the amount of water with which the container is charged. The arrangement if such that the speed of the apparatus will vary according to demand, e.g., when the apparatus is utilized to run a generator.

FEATURES

A feature of this invention resides in the provision of a method and apparatus wherein the rising and falling of water containers, sequentially charged and discharged with water, is translated into useful work.

Another feature resides in the provision of submering an inclined conduit in a body of water whereby the water flowing through the conduit is raised above the outlet of the conduit a distance less than the inlet thereto and is dispensed therefrom in a controlled manner for charging the container with a predetermined amount of water.

Another feature resides in the provision of a co-ordinator operatively associated with a pair of counterbalanced containers wherein one container is being charged with a predetermined amount of water as the other is being discharged.

Another feature resides in a controller for controlling the speed in which the apparatus operates.

Other features and advantages will become more readily apparent when considered in view of the drawings in which:

FIG. 3 is a section view of a container utilized in the apparatus of FIG. 1.

FIG. 9 is a diagrammatic showing of a control means for controlling the speed of the apparatus of FIG. 1.

FIG. 10 is a modified embodiment of the invention.

FIG. 11 is a detailed illustration of a container utilized in the embodiment of FIG. 10.

FIG. 12 is a side view of the containers of FIG. 11.

FIG. 13 is a detail of construction.

DETAILED DESCRIPTION

Figure 8:
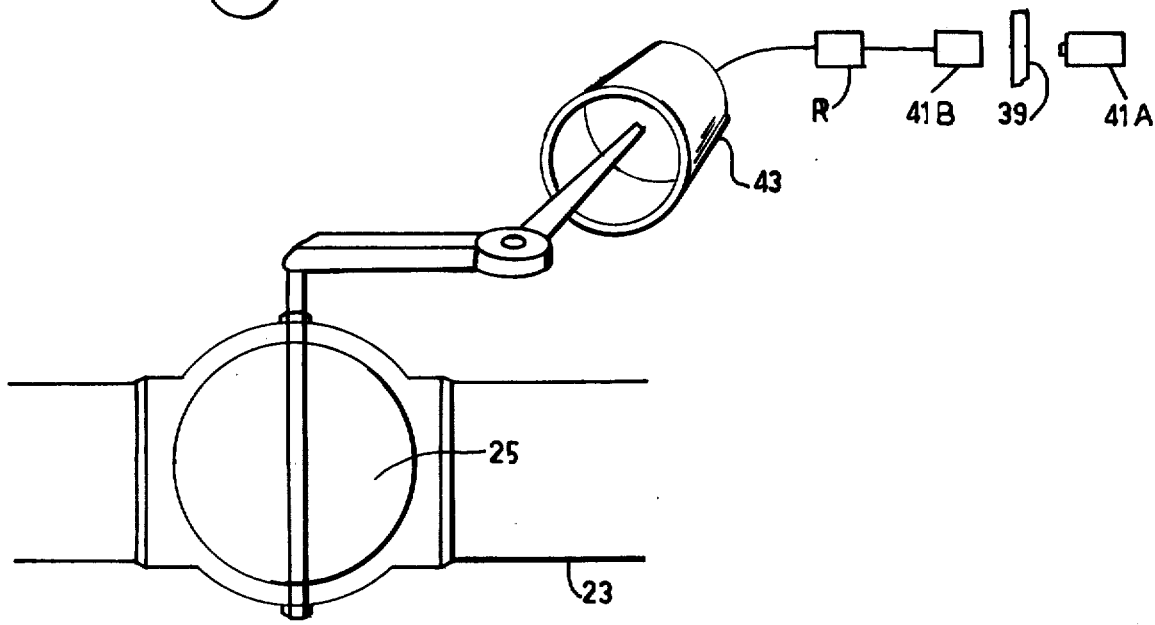
FIG. 8 is a schematic diagram illustrating the water valve assembly.

The present invention is directed to a method of utilizing the stored energy in a body of water, e.g., a stream, river and the like for producing useful work. The manner in which this stored energy can be translated into mechanical energy for producing useful work is to submerge a pipe or conduit 20 in a river or stream 21 or the like whereby the inlet end 20A of the pipe or conduit 20 is disposed into the flow of the current and at an elevation higher than that of the outlet end 20B thereof. It will be understood that the conduit 20 may be of any convenient length which is dependant upon the difference in height between the inlet 20A and outlet 20B which is desired. The water then flowing into conduit 20 is raised to an elevation which is less than that of the inlet 20A by a section of an upright standpipe 22. The water rising in the standpipe is directed to a distributing manifold 23. Spaced along the length of the distributing manifold 23 are a series of nozzles 24, each being controlled by a valve 25 (FIG. 8) as will be hereinafter described. The water flowing through the manifold 23 is sequentially distributed to counterbalanced containers whereby the containers are sequentially filled in a manner whereby the filled or weighted containers will fall, and in doing so will cause an empty container to rise to a position wherein it will be filled as the other or weighted container is being discharged of its contents. Thus by timing the charging and discharging of the counterbalanced containers, a drive is imparted to a drive shaft in a manner such that the drive shaft is rotated in a unitary direction. The rotation of the drive shaft is thereafter translated into useful work, e.g., for turning an electric generator to produce electrical current or for any other type of useful work; e.g., mechanical energy.

FIGS. 1 to 9 illustrate one system or apparatus 26 for performing the described method. In this embodiment, there is disposed dowstreamwise of the river or stream 21 an apparatus of the illustrated embodiment 26. This apparatus 26 comprises a pair of laterally spaced apart drive shafts 27 and 28 which are suitably journalled in appropriate bearing supports (not shown). Spaced along the drive shaft 27 are one or more rotary means which may comprise a sprocket or pulley 27A. In the illustrated embodiment fourteen such rotary means are shown; however, the number may vary in accordance with design variations and/or considerations. Mounted on shaft 28 are a comparable number of complementary rotary means 28A, similar to rotary means 27A.

Figure 2:
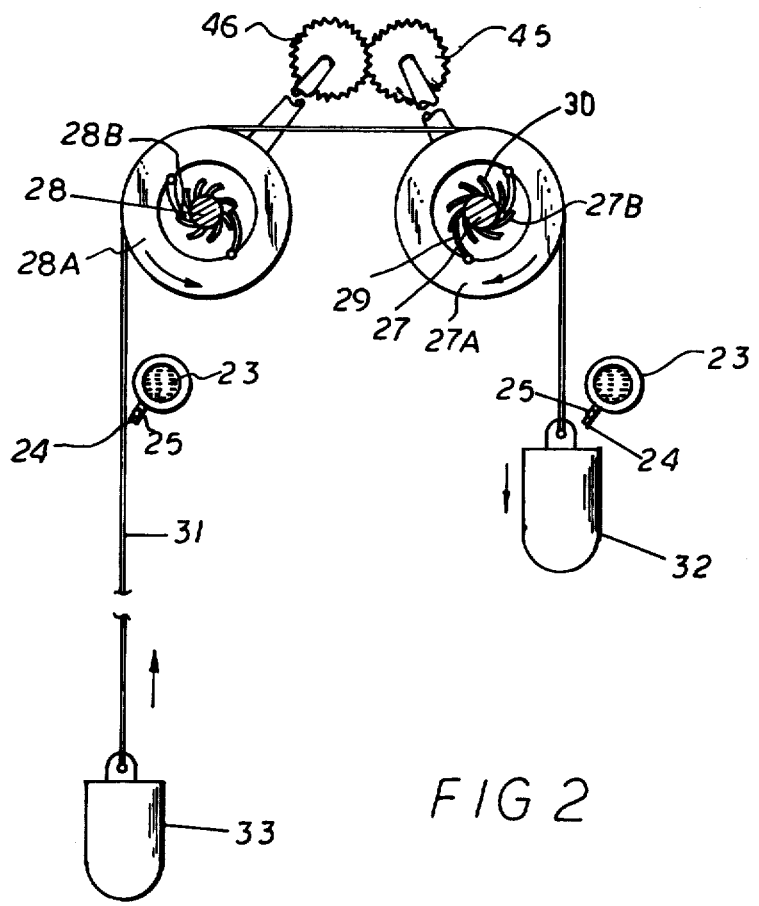
FIG. 2 is an end view of the apparatus of FIG. 1.

Operatively associated with each of the sprockets or pulleys 27A and 28A is an unidirectional clutch means 27B and 28B respectively. As best seen in FIG. 2, the clutch means 27B is operatively associated with its sprocket 27A so that when the sprocket 27A is rotated in a clockwise direction, the drive shaft 27 is also engaged in driving relationship through the engagement of the clutch means to impart a drive to the drive shaft in a clockwise direction (FIG. 2). When the sprocket 27A is rotated in a counterclockwise direction, the clutch means is disengaged from driving relationship relative to the shaft so that sprocket 27A is able to free wheel relative to shaft 27. In the illustrated embodiment, the unidirectional clutch means 27B is illustrated as a ratchet and pawl type whereby rotation of the sprocket in its clockwise direction causes the pawl 29 to engage a tooth of the ratchet 30 to lock the shaft in driving relationship. Rotation of the sprocket 27A in the opposite direction will cause the pawl to slip over the ratchet teeth to permit the sprocket to free wheel relative to the shaft 27.

The clutch means 28B associated with the complementary sprockets 28A are similarly constructed, but operate in a reverse manner. That is the clutch means 28B are rendered unidirectional to effect the drive of drive shaft 28 in a counterclockwise direction when the associated sprocket 28A is rotated in a counterclockwise direction, and whereby the sprocket 28A is in free wheeling relationship with the associated drive shaft 28 when sprocket 28A rotates in a clockwise direction. While a ratchet 30 and pawl 29 type of unidirectional clutch means is illustrated and described, it will be understood that various other types of unidirectional clutch mechanisms may be utilized in lieu thereof.

Threaded over the complimentary pairs of rotary means or sprockets 27A and 28A is a flexible drive means in the form of a chain or cable 31. Connected to each end of the chain or cable 31 is a container 32 and 33, which of similar size and construction.

As best seen in FIG. 3, each container 31 and 32 comprises an open top vessel 34 sized to contain a predetermined amount of water. Formed in the bottom wall 35 of the vessel is a discharge opening 36 which is arranged to be closed by a stopper or closure 37. The closure 37 includes a shank 37A which is connected to a solenoid 38 which when energized will cause the closure 37 to be moved to a raised position to open the discharge opening 36. When the solenoid 38 is deenergized, the stopper or closure will fall to its seated position to seal the opening 36 as shown in the solid line showing of FIG. 3.

Operatively associated with the respective containers 31 and 32 is a coordinating means to control the filling and discharging of the respective containers 31 and 32 as will be hereinafter described. The coordinating means includes a bifurcated coordinator 39 which is connected to a float 40. The float 40 is confined in a chamber 44 which is an adjunct of the vessel 34; and the chamber 44 is opened to the main body of the vessel. The float 40 is provided with a pin 40A which is arranged to ride in a helical slot 40B formed on the internal wall of the chamber 44 so that when the float rises as the water fills chamber 44, the float will rotate within the chamber 44 to rotate the bifurcated coordinator 39 approximately 90°. As will be hereinafter described, the coordinator 39 functions to sequence the charging of one container, e.g., container 32 as the other complementary container is discharging its contents in a predetermined manner.

Operatively associated with the coordinator 39 is an actuating means 41 for controlling the opening and closing of valve 25, and an operating means 42 for controlling the opening and closing of the discharge opening 36 in the container. It will be understood that an actuating means 41 and an operating means is required for each container 31 and 32.

As best seen in FIGS. 3, 4, and 5, and 8 the actuating means 41 includes a light beam source 41A and an oppositely disposed photo cell 41B. The photo cell 41B is connected in an electric circuit to a relay R which in turn is connected in circuit with a solenoid 43 for operating valve 25. The arrangement is such that when the light beam from the light source 41A is interrupted, the relay R is energized and actuates the solenoid to move the valve 25 to an open position. Accordingly, when valve 25 is opened, water from the nozzle 24 controlled thereby is permitted to flow into the associated container.

Figures 4, 5:
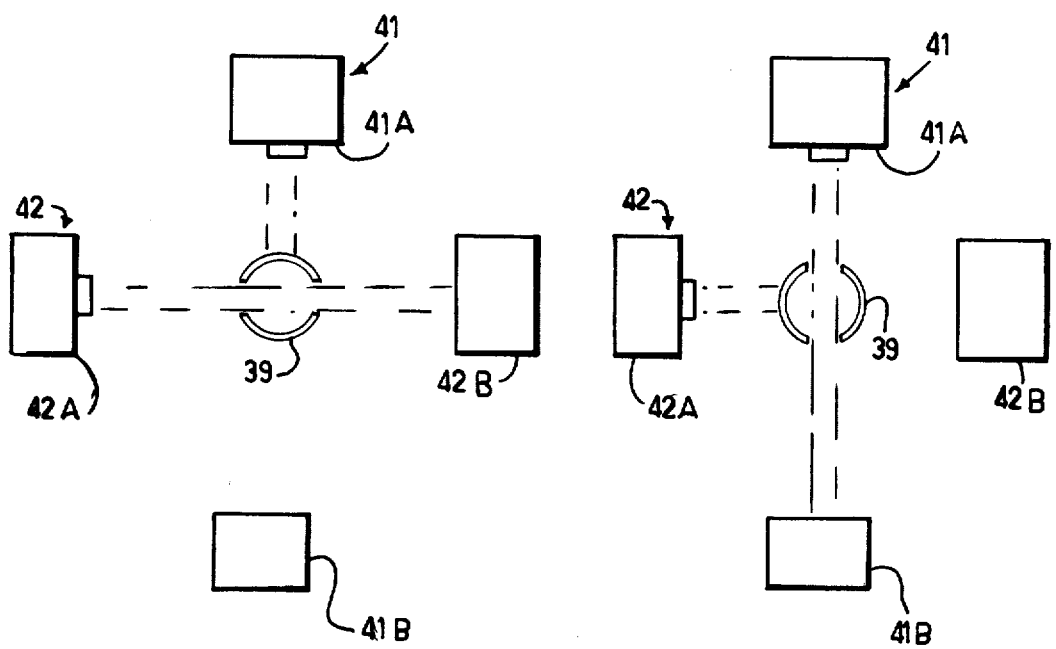
FIG. 4 is a diagrammatic plan view of the actuating and operating means for controlling the charging and dischargine of the respective containers illustrating the actuating charging means in the operative position.
FIG. 5 is a view similar to that of FIG. 4, but illustrating the operating discharging means in the operative position.
Figure 6:
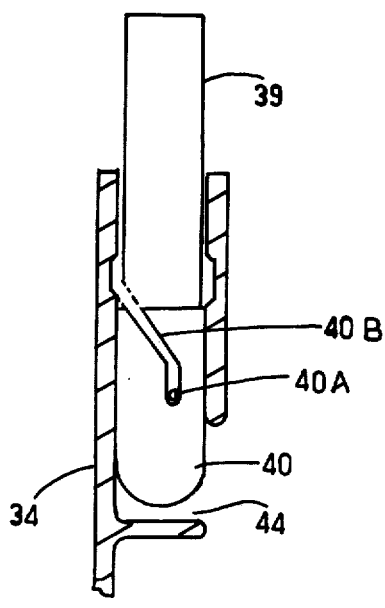
FIG. 6 illustrates a detail showing of the coordinating means in the operative water charging position.
Figure 7:
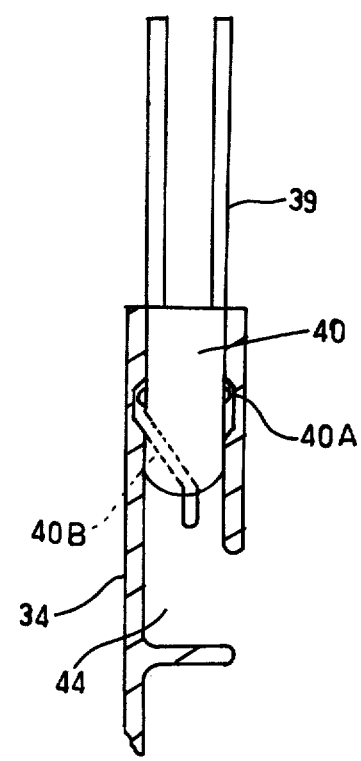
FIG. 7 is a view similar to that of FIG. 6 but showing the coordinating means in the operative discharging position.

The light source 41A and photo cell 41B are disposed so that when the container associated therewith reaches its uppermost limit, the coordinator 39 is disposed so that the light beam from source 41A is cut-off from its photo cell 41B as seen in FIG. 4; permitting the water valve 25 to open as hereinbefore described.

Associated therewith is an operating means 42 for effecting the opening and closing of the discharge opening of the other or complementary container. Referring to FIGS. 3, 4 and 5, the operating means 42 includes a second light source 42A and an associated photo cell 42B. Photo cell 42B is connected in circuit with a relay $R_2$ which in turn is in circuit with the solenoid 38 of the complementary container. As seen in FIG. 3, when the vessel 31 is filled, the coordinator 39 in its raised position will rotate 90° to interrupt the light beam from the operating light source 42A to activate the relay $R_2$ to energize solenoid 38 to open the discharge opening of the lowered container. In doing so, the light beam from the actuating light source 41B is permitted to focus on the photo cell 41B causing the water valve to close. Thus as the weight the water has been discharged from the lowermost container, the weight of the filled container will over balance the empty container causing the filled container to fall and the empty one to rise. In doing so the falling container effects the drive of its associated drive shaft, e.g., shaft 27 in FIG. 2. Thus the alternate rising and falling of the containers will effect the drive of its appropriate drive shaft. Because the respective sprockets are connected by means of an unidirectional clutch means to its respective shaft, it will be noted that the respective shafts are driven only when the associated weighted or filled container is falling.

Figure 1:
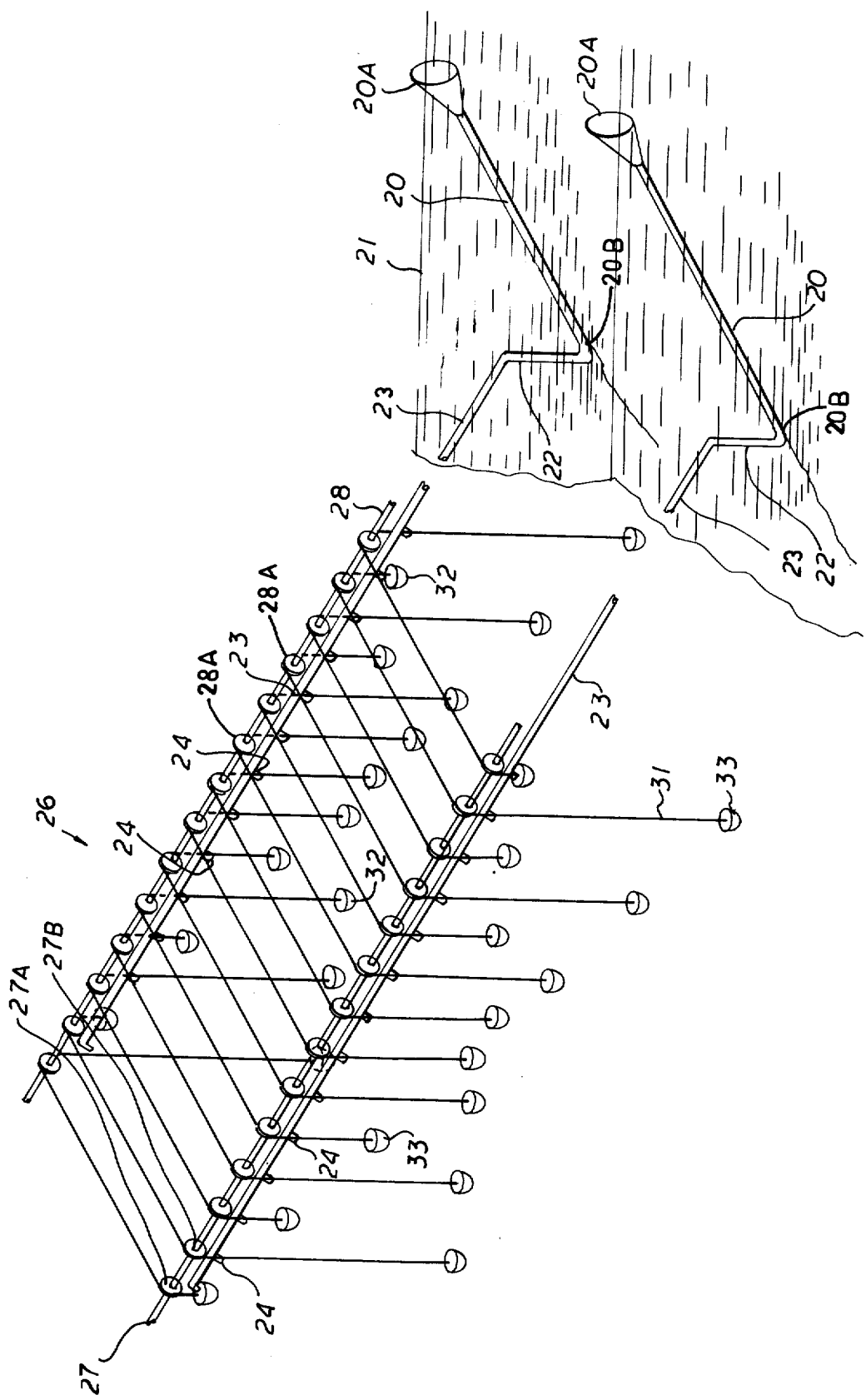
FIG. 1 is a fragementary diagrammatic side elevation view of an apparatus embodying the invention.

To insure uniform continuous drive of the respective shafts 27 and 28 a plurality of sprockets and associated chain drives are disposed thereon. Referring to FIG. 1, the arrangement is such that the plurality of containers which are driving one shaft are filling and falling in a cascading fashion, i.e., the filled containers are timed so that they are at different stages of fall. Thus, as shown there results an even and continual transmission of power to the respective shafts 27 and 28. For example if there are fourteen containers suspended from chains on shaft 27 going clockwise, and fourteen containers suspended from chains on shaft 28 going counterclockwise, there would result seven full containers descending from the shaft 27 going clockwise and an equal number of filled containers would be descending from the shaft turning counterclockwise. Seven empty containers suspended from each shaft would be rising simultaneously and proportionally to the containers suspended on the other end of the chain. In operation, each container would be sequenced to starts its decent after a lapse of a predetermined interval, e.g., 30 seconds, alternating from side to side to result in a cascading effect as seen in FIG. 1; of seven full containers on each side going down while there will be an escalating effect on both sides of seven empty containers rising. The end result is an even, uniform transmission of power.

To further insure that the respective shafts turn at the same rate of speed, a pair of intermeshing gears 45 and 46 or suitable gear train may be journalled to shafts 27 and 28 respectively.

A control means 47 may be also provided to control the speed of the apparatus 26. As shown in FIG. 9, the control means 47 includes a driving sprocket 48 journalled on one drive shaft, e.g, shaft 27. The driving sprocket 48 in turn is connected in driving relationship to a crank shaft wheel 49 through an endless flexible drive 50. The crank shaft wheel 49 is connected by a connecting rod 51 to the piston 52 of a piston and cylinder assembly 53.

As shown the cylinder 53A of the assembly 53 is connected in communication with a reservoir 54 containing a supply of a suitable liquid, e.g., water or oil by means of a conduit 55. A one way check valve 56 is interposed in conduit 55 to insure that liquid will flow from the reservoir to the cylinder 53A only; as indicated by arrows A. An outlet conduit 57 connects the cylinder in communication with the reservoir 54, and a check valve 58 is disposed in conduit 58 in insure liquid flow in the direction of arrow B only.

A regulating valve 59 is disposed on conduit 57 between the check valve 58 and the reservoir. The regulating valve 49 is adjustable so that the back pressure operating on the piston head 52 A may be controlled, and thereby regulate the speed of the apparatus or system 26.

In operation, it will be noted that the rotation or drive of shaft 27 will effect the drive of the piston 52 through the interaction of the crank shaft wheel 49 and connecting rod 51. Thus by opening or closing of the regulating valve 59, the resistance or backpressure imposed on the piston head as it reciprocates in cylinder 53A will result in controlling the speed of shaft 27 and its complementary shaft 28.

The described apparatus operates as follows. By inclining a conduit 20 in a body of water and locating a manifold conduit 23 at an elevation below the inlet 20A of conduit 20, water can be raised to the level indicated. By controlling the opening and closing of the water valves 25, the respective containers can be sequentially filled so that the weight of the full container will overbalance the complementary empty containers causing the former to fall and the latter to rise. In doing so the falling conainter will effect the drive of its associated shaft through the interaction of the unidirectional clutch. By sequencing a plurality of rotary means or sprockets along the respective shafts, a continuous and uniform drive is achieved.

The valve operating means 41 and the container discharge closure means 42 for the respective complementary containers are sequentially actuated so that the discharge opening of the filled container is opened as the empty complementary container is being filled. By alternating the sequence the continually rise and fall of the containers is utilized to drive the respective drive shafts 27 and 28.

It will be understood that the respective drive shafts 27 or 28 may be directly connected to a generator for generating electricity or through appropriate mechanical connection and/or linkages effecting the translation of rotary energy into useful work.

It will be understood that the height through which the respective containers travel can vary as well as the size and capacity of the containers. Thus the amount of power which can be achieved can vary between very wide ranges. Where terrain permits drops of several hundred feet is possible.

The construction described can effectively operate as a power plant adjancent a flowing stream. The arrangement will facilitate locating a number of such units along a river or stream since the water can be retruned to the stream or river without any loss thereof. Thus tremendous energy can be produced without effecting any pollution or change in the surrounding environment. Also the arrangement will have no adverse effect on the marine life or navigable waterways.

FIG. 10 illustrates another embodiment of the invention. In this form the apparatus or system 60 comprises a pair of vertically spaced apart drive shafts 61 and 62. One or moe rotary means are journalled onto the respective shafts 61, 62. As shown, the rotary means comprises a sprocket or pulley 63, 64 journalling to shafts 61, 62 respectively. As hereinbefore described the rotary means are operatively associated with an unidirectional clutch means 63A, 64A respectively so that the drive of the respective shafts occur when the rotary means 63, 64 is rotated in one direction only; e.g., a clockwise direction as shown in FIG. 10. The clutch means is similar to that hereinbefore described with respect to FIGS. 1 and 2.

An endless flexible drive, e.g., a driving chain 65 is threaded over complementary rotary means 63, 64. Connected to the flexible drive 65 is spaced relationship are a series of similar containers 66.

In the illustrated embodiment, the containers 66 comprise open top vessels which are arranged to rotated about the rotary means 63 and 64 in a clockwise direction. The movement of the containers 66 is effected by successively causing each container to be filled with a liquid, e.g., water, the weight of which will cause the containers to travel along the path defined by the endless drive chain 65.

In the illustrated embodiment, a filling nozzle 67 is disposed adjacent the uppermost contaner 66A as it turns over the upper rotary means 63. It will be understood that the nozzle 67 is in communication with a supply of liquid, e.g., water. For purposes of description, the nozzle 67 is supplied with water by a system similar to that described in respect to FIG. 1. A suitable valve 68 is disposed in nozzle 67 to control the flow of water therethrough. The arrangement as will be hereinafter described is such that the nozzle valve 68 is opened only when the uppermost container 66A is in proper position for receiving the water for weighing the container 66A.

Referring to FIGS. 11 to 13, each container 66 comrpises a vessel of any suitable shape having a front wall portion 66B. Secured or formed in the front wall portion 66B on the exterior surface is a slideway or guide 73.

Connected to each container 66 is a means for activating the valve 68 when the uppermost container 66A has been properly positioned for receiving water. The latter means comprises a flexible ribbon or band 69 which is arranged to be coiled about a spool 70 carried on a suitable bracket 71 connected to the container 66. The free end of the ribbon 69 is connected to a slider 72 which is slideably disposed in slideway or guide 73. A lock or set screw 74 extends through the slider 72 to provide a means whereby the slider can be secured in any adjusted position of the ribbon 69. It will thus be apparant that the length of the ribbon along the front of the container can be adjusted.

Disposed adjacent the uppermost container and in the path of travel thereof is a remote controll means for operating the nozzle valve 68. In the illustrated embodiment this control means includes a light beam source 75 and an oppositely disposed photo cell 76. As hereinbefore described, the photo cell is connected in circuit to a relay 77 which in turn is connected to a solenoid 78 which operates the valve 68 between open and closed position (See FIG. 10).

In operation when the ribbon 69 interrupts the light beam from source 75, as seen in FIG. 11, the photo cell energizes the relay 77 which in turn triggers the solenoid 78 to open the valve 68 permitting the water to flow into the container 66A. When the upper end of the ribbon 69 of the weighted container 66A has moved below the light beam, the relay is deactivated resulting in the solenoid moving the valve to its closed position. The arrangement is such that the valve 68 is opened each time that the uppermost vessel 66A is properly positioned as it rounds the upper rotary means 63.

As seen in FIG. 12 each vessel or container 66 is provided with an overflow pipe 80 which opens to the bottom 66C of the container. Therefore in the event of an overfill, the excess water will enter the overflow pipe 80 and be discharged into the next subjacent vessel or container.

In operation it will be noted that as each vessel 66 is filled that the weight of the descending vessel will create a clockwise rotation of the flexible drive 65; and through the interaction of the rotary means or sprockets 63, 64 effect the drive of shafts 61 and 62 accordingly.

As hereinbefore described the drive shafts 61 and 62 may be connected to drive a generator for producing electrical power or otherwise connected to suitable linkages and or drive for translating the rotary motion of the drive shafts into useful mechanical energy.

As the filled containers 66 rotate about the lower rotary means 64, the containers are successively inverted and emptied of their contents.

In operation, the adjusted ribbon 69 will activate the solenoid 78 by breaking the light beam for a predetermined period of time. In doing so it deactivates the photo cell 76 causing the relay 77 to send a signal to the solenoid 78 which will remain activated for whatever period of time the light beam from souce 75 remains interrupted by ribbon 69. The ribbon 69 by being adjustable can control the flow of water so that each container is assured of receiving a predetermined amount of water depending upon the demand for power and the speed of the apparatus; which may vary from time to time. For example, if the drive shaft 61 is directly connected to the drive of a generator, as the generator speeds up, as when the demand for current drops, the drive shaft 61 will speed up also, which will result in the containers moving at a faster rate of speed. This will result in the ribbon 69 carried on the containers 66A to pass through the light beam at a greater rate of speed resulting in the solenoid being activated for a shorter period of time. This results in charging a lesser amount of water into the container to effect a balancing out of the apparatus in accordance with demand for power. Conversely, if the demand for power increased, the apparatus will tend to slow down under the drag, e.g., caused by a generator. The ribbon 69 which has been adjusted for average speed will under increase demand be moving through the light beam at a much slower speed, thereby causing the water valve 58 to remain open for a longer period of time; thereby permitting more water to flow into the container. The increased weight of water will thereby cause the speed of the apparatus to catch up or balance out to the increase in demand. It will be understood that the containers will be proportioned to accommodate the amount of water required between a range of minimum and maximum demands.

Any excess of water will run out through the overflow pipe 80 to discharge or empty into the next subjacent container. Thus the purpose of the overflow pipe 80 is to pass any excessive water from an upper container to a lower container and so on for developing maximum dead weight in a shortest span of time as the apparatus continues to operate. Thus the flow of water will proportionally slow up as the apparatus speed picks up until a balancing out is achieved.

For the foregoing, it will be noted that the energy of drain off a body of water can be readily translated by the described method and apparatus into useful work in a relatively simple and expedient manner; and without the need of materially altering the environment or the flow of such waters.

While the invention has been described with respect to several embodiments, it will be appreciated and understood that variations and modifications may be made without departing from the spirit or scope of the invention.

What is claim is:

1. A system for the harnessing the power of moving liquid for producing useful work comprising:
    a pair of spaced apart drive shafts,
    a plurality of rotary means journalled on each of said drive shafts at spaced apart intervals to effect the drive thereof whereby the rotary means on one of said drive shafts has an opposite complementary rotary means on the other shaft,
    a unidirectional clutch means operatively connecting each such rotary means to its respective drive shaft whereby one drive shaft is rotated in one direction and the other drive shaft is driven in opposite direction as said rotary means is actuated,
    a flexible drive threaded over the respective complementary pairs of oppositely disposed rotary means, said flexible drive having opposed end portions,
    a container connected to each portion of the respective flexible drives,
    and means for alternately charging and discharging said containers disposed on opposite ends of said flexible drive with liquid in a predetermined sequence to effect the cascading of said containers in predetermined timed relationship over the respective drive shafts so that said cascading containers effect a continuous, uniform drive of the respective drive shafts.

2. The invention as defined in claim 1 and including means for controlling the speed of said system.

3. The invention as defined in claim 1 wherein said means for sequentially charging and discharging each of said containers comprises:
    a nozzle operatively associated with each of said containers, said nozzle being connected to a source of water supply,
    a valve for controlling the flow of water through said nozzle,
    said containers each having a discharge opening and a closure means for sealing said discharge opening closed,
    an actuating means operatively associated with each container for opening said valve when the container is in its uppermost limit,
    and operating means operatively associated with said closure means to effect the opening of said discharge opening when the container reaches its lower limit of travel,
    and means coordinating the operation of said activating means and operating means to effect the opening of said valve to fill one container with water as the discharge opening for the other complementary container is opened to empty it of water.

4. The invention as defined in claim 3 wherein said last mentioned means includes a submerged conduit angled downwardly in a body of water, said conduit having an inlet and a lower end portion,
    a stand pipe connected to a lower end portion of said submerged conduit,
    said stand pipe having an outlet disposed at a elevation below that of the inlet to said conduit,
    a distributing manifold connected to the outlet of said stand pipe,
    and said nozzles being connected to said manifold at spaced intervals therealong.

5. A system for harnessing the power of moving liquid for producing useful work comprising:
    a pair of spaced apart shifts,
    a rotary means journalled to each of said shafts to effect the drive thereof,
    a flexible drive threaded about said rotary means,
    a plurality of containers connected to said flexible drive,
    means for sequentially charging and discharging said containers with a liquid whereby the weight of said liquid is utilized to effect the lowering and raising of said containers for rotating said shafts whereby the rotation of said shafts is utilized to produce useful work,
    a unidirectional clutch means operatively associated with said rotary means whereby said rotary means effects the drive of said respective shafts in one direction only,
    and said means for sequentially charging and discharging said containers comprises:
    a nozzle adapted to be connected to a source of water supply,
    a valve for controlling the flow of water to said nozzle,
    said containers each having a discharge opening and a closure means for sealing said discharge opening closed,
    an actuating means operatively associated with said containers for opening said valve when each of said containers is in its uppermost limit,
    Operating means operatively associated with said closure means to effect the opening of said discharge opening when the respective containers reaches its lower limit of travel,
    and means coordinating the operation of said activating means and operating means to effect the opening of said valve to fill one container with water as the discharge opening of the other complementary container is opened to empty it of water, said actuating means includes a light beam source,
a photo cell disposed opposite said light beam source,
said valve means including a solenoid for effecting the operation thereof,
and a relay connected in circuit with said solenoid and photo cell whereby said photo cell causes said relay to energize said solenoid when said light beam is cut-off.

6. The invention as defined in claim 5 wherein said operating means includes a second light beam disposed at an angle to said first light beam,
a second photo cell disposed opposite to said second light beam,
a solenoid operatively connected to said container closure means,
and a second relay connected in circuit with said closure means solenoid and said second photo cell so that said second relay is activated to energize said closure means solenoid when said second light beam is cut-off.

7. The invention as defined in claim 6 wherein said coordinating means includes:
a bificated coordinator associated with each container,
a float connected in said coordinator whereby said coordinator rises as said container is being filled,
and means for effecting rotation of said coordinator whereby the light beam to photo cell controlling the valve relay is interrupted in the lower position of said float and whereby the second light beam to the second photo cell controlling the closure solenoid is cut-off in the raised position of said float.

8. A system for harnessing the power of moving liquid for producing useful work comprising:
a pair of spaced apart shafts,
rotary means journalled to each of said shafts to effect the drive thereof,
a flexible drive threaded about said rotary means, a plurality of containers connected to said flexible drive,
and means for sequentially charging and discharging said containers with a liquid whereby the weight of said liquid is utilized to effect the lowering and raising of said containers for rotating said shafts whereby the rotation of said shafts is utilized to produce useful work,
and including means for controlling the speed of said system,
said control means comprising:
a piston pump having a cylinder and piston moveably mounted therein,
a means for driving said piston pump operatively connected to said one of said shafts,
a liquid reservoir,
an inlet conduit connecting said reservoir with said cylinder whereby liquid is drawn into said cylinder as said piston is retracted within said cylinder,
and an exhaust conduit interconnecting said cylinder with said reservoir whereby the liquid drawn into said cylinder is discharged therefrom on the compression stroke of said piston,
and a regulating valve disposed in said exhaust conduit to control the liquid flow therethrough.

9. The invention as defined in claim 8 wherein a check valve is disposed in each of said inlet and exhaust conduits.

10. A system for harnessing the power of moving water for producing useful work comprising:
a pair of spaced apart drive shafts,
a plurality of rotary means journalled to each of said shafts at spaced intervals therealong to effect the drive thereof, the rotary means on one shaft having opposite complementary rotary means on said other shaft,
an unidirectional clutch means operatively connecting each said rotary means to its respective shaft whereby said rotary means effects the drive of said respective shaft in one direction only, whereby one of said drive shafts is rotated in one direction and the other drive shaft rotated in the opposite direction,
a flexible drive threaded over said complementary pairs of rotary means on said respective shafts,
a container connected to a respective opposed ends of said flexible drive whereby said respective container is alternately raised and lowered,
and charging means for alternatively charging each of said respective containers with water whereby the weight of said water causes said water filled container to fall,
each of said containers having a discharge means,
and means operatively associated with said discharge means to effect the opening thereof to discharge the water therefrom when said charged container has reached its lowest point of travel,
said charging means being rendered operative to respectively charge the respective containers when said container reaches its uppermost raised position,
and means for actuating said charging means when said respective containers reaches its uppermost raised position.

11. The invention as defined in claim 10 wherein the alternately charged containers spaced along each of said drive shafts are cascading downwardly in a predetermined timed sequence as the alternate opposite empty containers are rising in a similar timed sequence.

12. The invention as defined in claim 10 wherein said charging means comprises:
a conduit which is angled downwardly in a body of flowing water,
a stand pipe connected to the discharge end of said conduit,
said stand pipe having its outlet disposed at an elevation below that of the inlet to said conduit,
a distributing manifold connected to the outlet of said stand pipe,
said distributing manifold having a plurality of nozzle spaced along the length thereof,
said nozzles being disposed adjacent said containers where said containers are at their uppermost position whereby said nozzles discharge water to fill the respective containers when actuated.

13. The invention as defined in claim 12 and including a valve means associated with each of said nozzles for controlling the operation thereof.

14. The invention as defined in claim 13 and including a gear connected to each of said drive shafts,
said gears being connected into meshing relationship to insure that said shafts turn at the same rate of speed.

15. A system for harnessing the power of flowing water in a body of water to produce useful work comprising:
a conduit submerged to said body of water, said conduit having an inlet and outlet, said outlet being disposed at an elevation below that of said inlet at a point downstreamwise therefrom, a stand pipe connected to the outlet of said conduit, said stand pipe having a discharge and disposed at an elevation below said inlet and above said outlet of said conduit, a distributing manifold connected to the discharge end of said stand pipe, nozzle means connected to said distributing manifold, valve means for controlling the opening and closing of said nozzle means, a pair of oppositely disposed drive shafts, a plurality of rotary means journalled on each of said drive shafts at spaced intervals therealong for effecting the drive thereof, an unidirectional clutch means operatively connecting each of said rotary means to its respective drive shaft to effect the drive of said respective shafts in one direction only, a flexible drive threaded over complementary rotary means of said respective drive shafts, a container connected to opposed ends of each of said flexible drives, each of said containers having a discharge opening, and means for closing said discharge opening, said containers being adapted to alternately rise and fall between an upper and lower limit of travel, and actuating means operatively associated with each of said containers to effect the operation of said valve means for charging the container with water when said container is at its uppermost limit, and operating means operatively associated with said container for effecting the discharge of water from said container when said container is at its lowermost limit of travel.

16. A method of utilizing the power of flowing water as for example, in a river to produce useful work comprising the steps of:

including a submerged conduit in said river so that the outlet of said conduit is disposed at a lower elevation than the inlet thereof, whereby the discharge end is downstreamwise of said inlet end, raising the water flowing through said discharge end by means of a connected stand pipe to an elevation below that of the inlet, distributing the raised water to connected counterbalanced containers which are threaded about a drive shaft whereby the containers are alternately filled and emptied to effect alternating rising and falling of said containers for driving said drive shaft.

* * * * *